United States Patent [19]

Collings

[11] 4,186,934
[45] Feb. 5, 1980

[54] SCOOTER VEHICLE

[76] Inventor: Thomas J. Collings, 52 Railroad Ave., Glen Head, N.Y. 11545

[21] Appl. No.: 946,155

[22] Filed: Sep. 27, 1978

[51] Int. Cl.² .......................... B62M 1/04; B62K 9/00
[52] U.S. Cl. ...................... 280/221; 74/143; 280/254
[58] Field of Search .............. 280/221, 253, 254, 255, 280/256, 257, 258, 293; 180/33 C, 33 D, 74, 65 A, 30; 74/143, 142, 222, 227; 105/93, 89

[56] References Cited

U.S. PATENT DOCUMENTS

| | | | |
|---|---|---|---|
| 3,415,540 | 12/1968 | Portnoff | 280/254 |
| 3,992,029 | 11/1976 | Washizawa | 280/87.04 R |
| 4,023,434 | 5/1977 | Axelsson | 74/222 |

FOREIGN PATENT DOCUMENTS

| | | | |
|---|---|---|---|
| 491631 | 3/1953 | Canada | 180/33 D |
| 429098 | 1/1948 | Italy | 280/253 |

Primary Examiner—Joseph F. Peters, Jr.
Assistant Examiner—Randall A. Schrecengost
Attorney, Agent, or Firm—James P. Malone

[57] ABSTRACT

A scooter vehicle has a chassis, and a front wheel mounted on the center line of the chassis, a rear wheel mounted on the chassis, and a steering column attached to the front wheel. A pair of ratchet gears are connected one to each of the rear wheels. A platform is rotatively mounted on the chassis. The platform has front and rear foot portions mounted with an angle of less than 180° between them. First chain means connects the front of the platform for driving one of the ratchet drive wheel gears and second chain means connects the rear of the platform for driving the other of the ratchet drive wheel gears.

5 Claims, 11 Drawing Figures

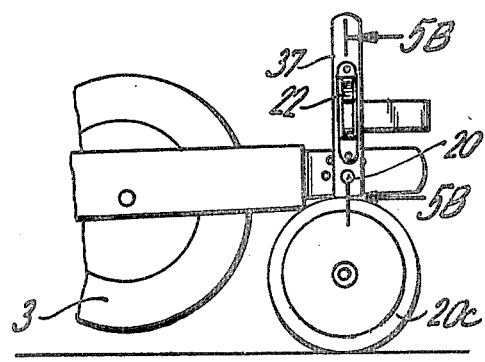
FIG. 5
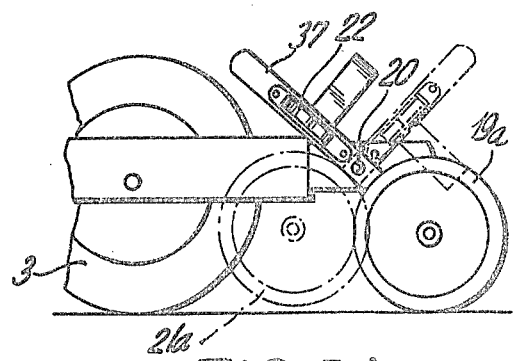
FIG. 5A
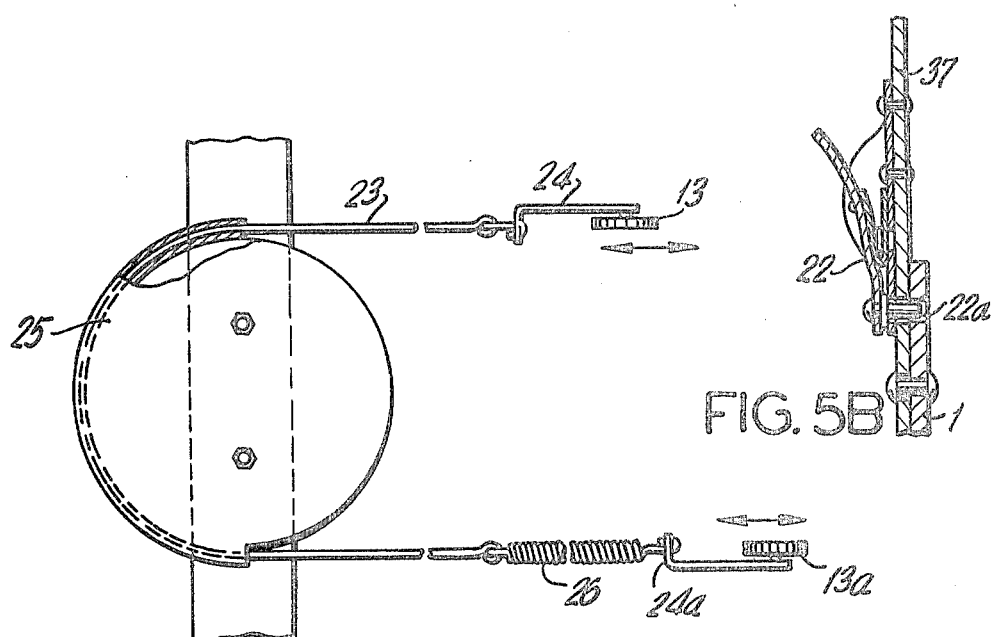
FIG. 5B
FIG. 6
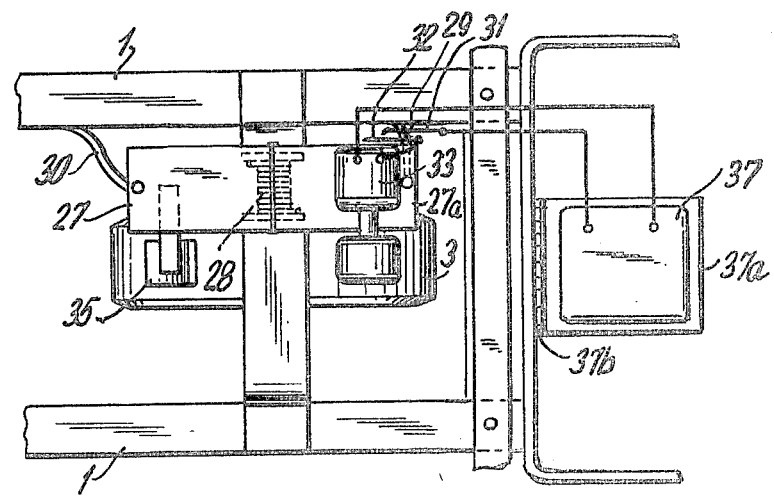
FIG. 7

SCOOTER VEHICLE

This invention relates to scooter vehicles.

More particularly, the invention relates to a self propelled scooter device having a rotatably mounted dual platform with front and rear sections for the feet of the user. The scooter is propelled by the user rocking back and forth on the dual platform. The drive is provided by a pair of chains each connecting one of the dual rotative platforms to a series of sprocket gears with the ongoing chains each connected separately to a ratchet gear mounted on either side of the rear wheel.

A principal object of the invention is to provide a scooter vehicle having a chassis, a front wheel mounted on the center line of the chassis, a rear wheel mounted on the chassis, a steering column attached to the front wheel, a pair of ratchet gears, one connected to each side of the rear wheel, a platform rotatively mounted on the chassis, the platform having front and rear foot sections mounted with an angle of less than 180° between them, first chain means connecting the front of the platform for driving one of the ratchet gears, and second chain means connecting the rear of the platform for driving the other of the ratchet gears.

Another object of the invention is the provision of a scooter structured low to the ground, having two wheels centered under the chassis, guided by a steering column attached to the front wheel, with the elongated foot standing platform divided at the center for separate front and rear foot standing, with each platform attached to moveable structural support, and with each platform section having underlying gear energizing mechanism and with each foot platform section angled to each other and structurally joined at their underpinning support, mounted on a common axle for see-saw movement from alternately leveled to inclined positions by distributed foot weight motion on the foot platforms, for propelling the scooter forward and with means for employing auxiliary battery motor drive power and braking action, both actuated from handlebar controls.

Another object of the invention in a vehicle of this kind is to provide a set of auxiliary, undersized wheels, structurally joined for coordinated movement on a common axle and locked to the scooter frame by its free turning axle structure, permitting the set of auxiliary wheels to be manually moved in varying positions of elevation in relation to the scooter frame, with means of locking the wheels above ground to avoid conflict with two wheel scooter operation, and means for lowering same to locked ground contact for four wheel standing or riding, and means for positioning the auxiliary wheels to elevate the scooter drive wheel above ground for free standing operation, including free standing pedal movement as an exerciser.

Another object of the invention in a vehicle of this kind having a gear energizing system, is to provide in the restricted space under each foot platform, a compounding energy thrust means by positioning under each actuating foot platform, a system of upper and lower chain sprocket gears so interconnected in position by chain belt relationship between its actuating foot platform and one of the ratchet sprocket driving gears mounted on either side of the scooter's rear drive wheel to provide an extended chain driving engagement with the rear drive wheel for forward scooter movement.

Another object of the invention of the kind specified is to effect a coordinating mechanical liasion between the front and rear foot platform driving systems, providing means when any one of the platforms is in upward movement, expanding its chain length gear spread in driving engagement with its ratchet sprocket gear on the rear drive wheel, the other foot platform in its see-saw response of opposite downward movement, is simultaneously releasing an equivalent amount of chain to the other foot platform system as its gear spread is narrowed and ad infinitum, and with continuous see-saw foot platform motion resulting in intermittent forward chain drive on one and then on the other ratchet drive sprockets resulting in uninterrupted forward scooter movement.

Another object of the invention in a vehicle of this kind is in having both foot platforms attached to their structural support at their outward ends, with the major portion of the foot platforms in suspension from their point of attachment, resulting in foot/body weight pressure on the suspended portion of the platform obtaining leverage advantage.

Another object of the invention in a scooter of this kind is providing a double hinged two sided structured mechanism above the rear drive wheel tire, providing braking action against the tire of the rear wheel from one side of the hinge structure, and on the other side, supporting an electric battery operated motor with rotary drive action against the tire of the rear drive wheel, and means for permitting choice of either foot power or electric motor power or simultaneous driving energy from both, and with the forward ratchet sprocket action on the rear drive wheel permitting holding the foot platforms inactive when electric motor power alone is used.

Another object of the invention in a vehicle of the kind specified is in providing hinging mechanism on the steering column to fold inwardly the long vertical steering column to a horizontal position for compact storage and shipment of the scooter.

BRIEF DESCRIPTION OF THE DRAWINGS

FIGS. 5, 5A and 5B, are detail views of the embodiment of FIG. 1.

FIG. 6 is a diagram illustrating the operation of the invention.

FIG. 7 is a detail plan view of the embodiment of FIG. 1.

Figure 1:
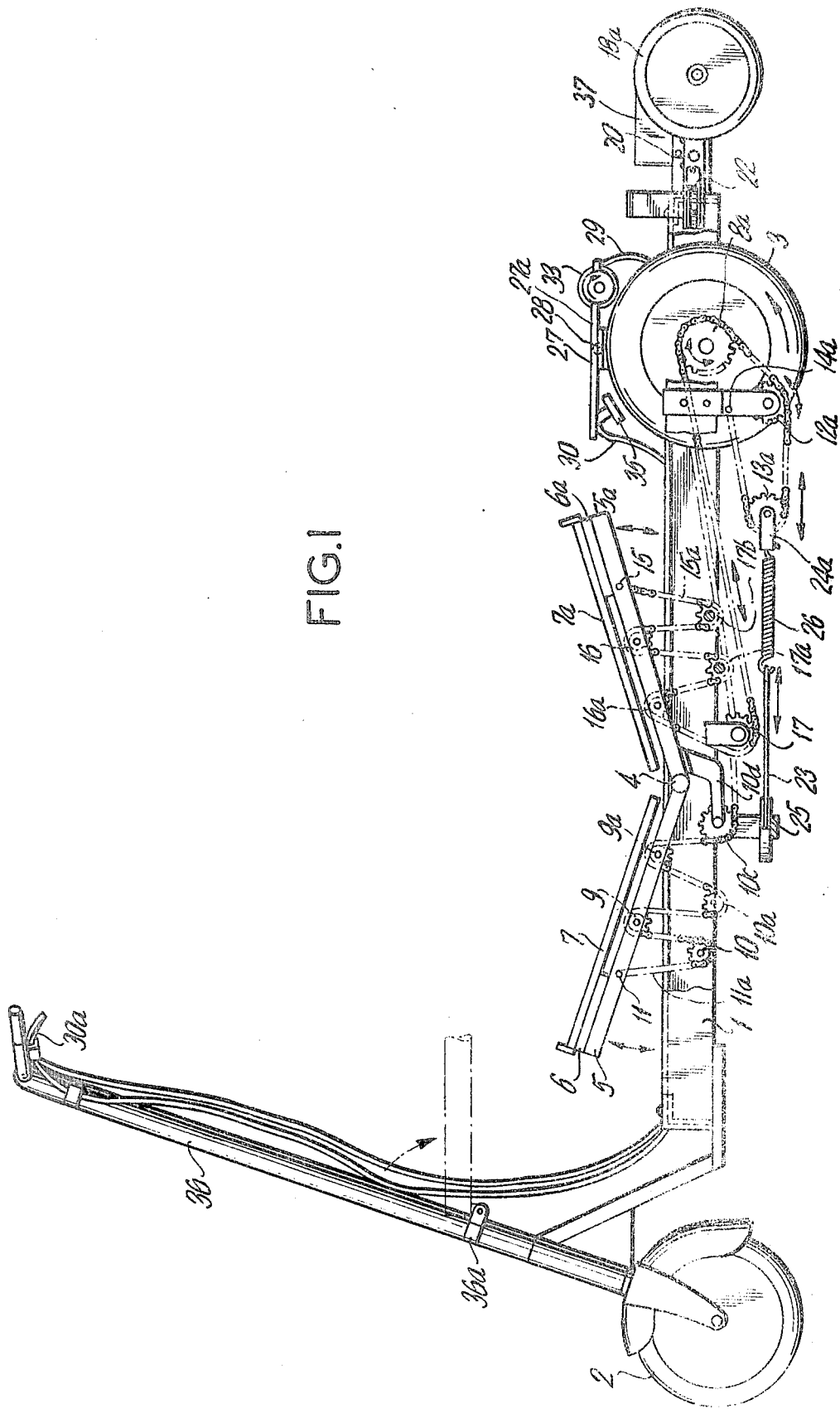
FIG. 1 is a side view of an embodiment of the invention.

Referring to the drawings, FIG. 1 indicates a scooter vehicle having an elongated frame 1 positioned close to the ground and mounted on a forward steering wheel 2, and a rear driving wheel 3. Across the frame 1, near middle, is a rotating axle 4, supporting in see-saw movement a one-piece angled platform supporting structure 5, 5a, having at the outward ends attaching members 6 and 6a, supporting front suspended foot platform 7 and rear suspended foot platform 7a.

Figure 3:
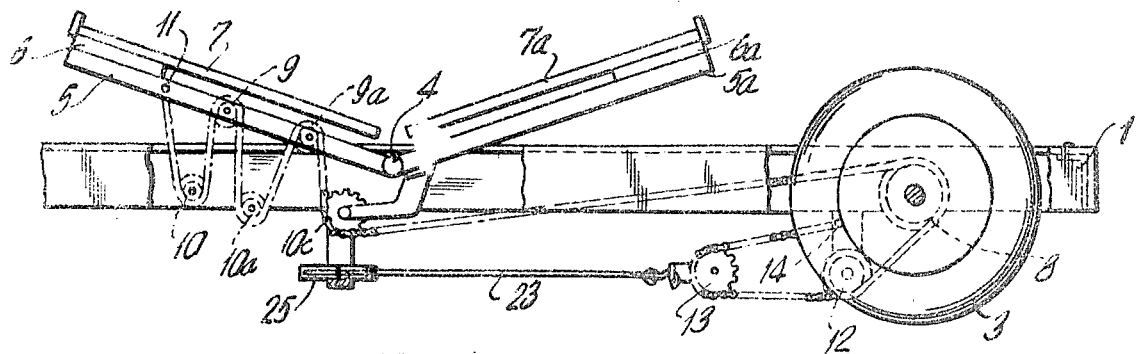
FIGS. 3, 3A, 3B and 4, are schematic diagrams illustrating the operation of the invention.
Figure 4:
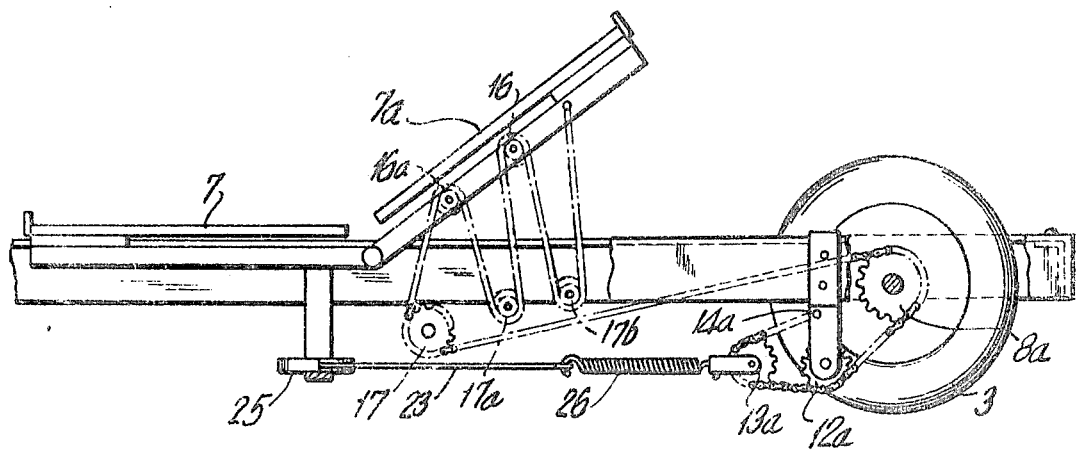

The rear drive wheel 3 has ratchet sprocket drive gears 8 mounted on its right side (in operating stance) and 8a on its left side as seen in FIG. 1 and FIG. 4. On front foot platform support 5, under its right side is attached at point 11, bicycle type chain 11a, which interconnects with sprocket gears 9 and 9a, which move up and down with their moveable support 5. In alignment below them attached in stationary position to the scooter frame 1 are sprocket gears 10, 10a, all in alignment with rear drive wheel ratchet gear 8. Also, in alignment with drive wheel ratchet gear 8 is a moveable sprocket gear 10c mounted on an angular arm which is attached under rear platform support 5a. Under the front platform support 5 of the attached chain from the starting point 11 engages successively all the aligned sprocket gears 10, 9, 10a, 9a, 10c, and extends to the rear to engage around ratchet drive sprocket 8, as shown in FIG. 3, and continues past aligning sprocket 12, and proceeds to engage around the suspended sprocket 13, to a final secured point 14, all shown in FIG. 3. This totally connected chain gear system comprises the front foot platform drive system.

On the rear foot platform support 5a, under its left side is attached at point 15 bicycle type chain 15a which interconnects with sprocket gears 16 and 16a which move up and down with their moveable support 5a. In alignment below them secured in stationary position to the scooter frame 1, are sprocket gears 17, 17a, 17b, all in alignment with the rear drive wheel ratchet gear 8a. Under the rear foot platform 5a, the attached chain from its starting point 15 engages successively all the aligned sprocket gears 17b, 16, 17a, 16a, 17 and extends to the rear to engage around the ratchet drive gear 8a, and proceeds on to the alignment gear 12a and around the suspended sprocket 13a to a final secured point 14a. This totally connected chain gear arrangement comprises the rear foot platform drive system.

Curved arm 10d is rigidly mounted on moveable structural support 5a and mounts sprocket 10c. When platform 7a is descending arm 10d and sprocket 10c give additional thrust to chain 11a.

As shown in FIG. 6, the front and rear foot platform drive systems are linked together for coordinated driving movement by cable 23 which connects on the right drive side to the hook lever 24 from the axle of suspended sprocket 13 and then circles a path around the half-circle track 25 and out the other side of the half-circle track to engage the take-up spring 26, with the other end of the spring attached to the hook lever 24a from the axle of sprocket 13a, completing the linkage between the front and rear platform chain gear drive systems.

Attached at the rear end of the scooter frame 1 are a pair of undersized auxiliary balancing wheels shown in FIGS. 1, 5, and 5A, in the varying positions of elevation by rotation of their axle 20, with wheel positions 18a, position in above ground contact, and with wheel positions 19a in ground contact, and with wheel positions 20c in full vertical ground contact elevating the scooter drive wheel 3 above its ground contact for free wheeling, and with wheel positions 21a, in ground contact somewhat above the ground contact level of scooter drive wheel 3, and all foregoing positions, in each instance, locked into position by spring bolt 22, which drops into hole 22a on shiftable lever 37 through to matching holes on side of frame 1.

As shown in FIG. 7, structurally mounted across the scooter frame at a position slightly above rear tire 3, is double hinged platform 27 and 27a supporting electric motor 33 on 27a side and on the side 27 supporting brake mechanism, 35. The platform wings 27 and 27a are held in level horizontal position by spring return drop hinge mechanism 28, with each platform 27, 27a, having a pull down cable 29, for the motor side 27a, and 30 for the brake side 27, actuated from handle bar controls 29a and 30a, which simultaneously with pulling down motor support side 27a, closes battery circuit contacts 31, 32 to energize the motor 33.

Figure 2:
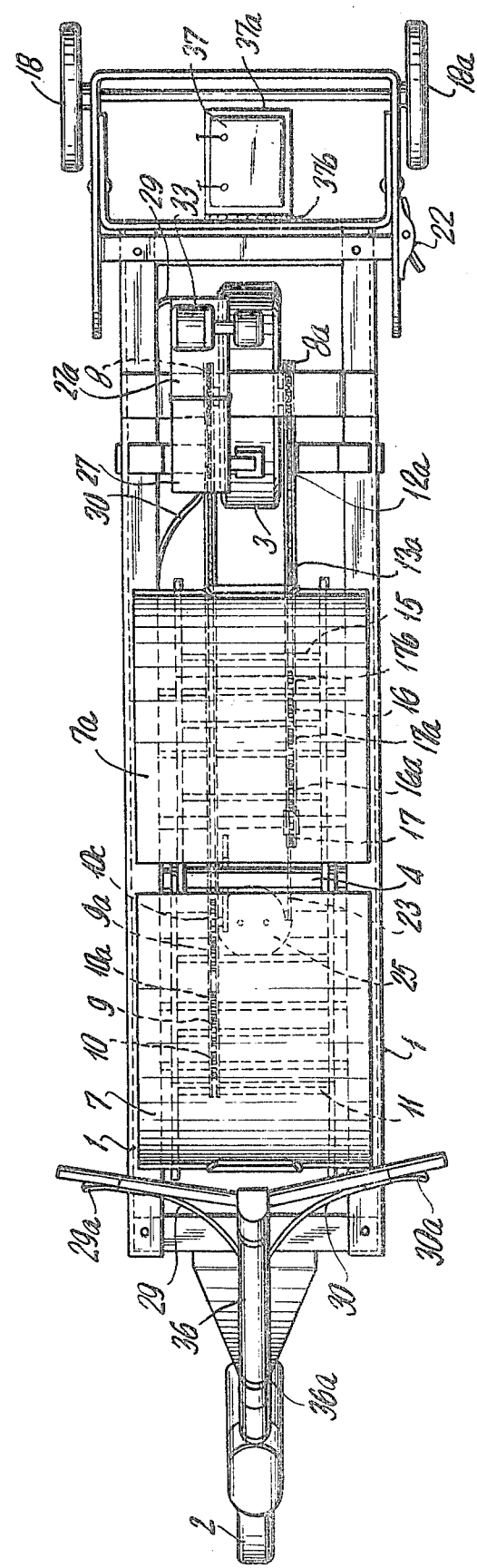
FIG. 2 is a plan view of FIG. 1.

As shown in FIGS. 1, 2 and 7, motor battery 37 is stationed in level position by platform 37a attached to rear of frame 1 with hinge stop mechanism 37b.

On the steering column 36 is a hinge-lock mechanism 36a located below its middle point for folding the upper hinged sections over the front and rear foot platforms 7 and 7a.

Figure 3A:
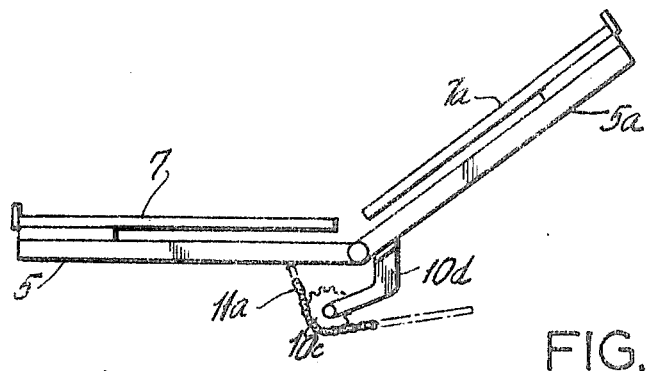
Figure 3B:
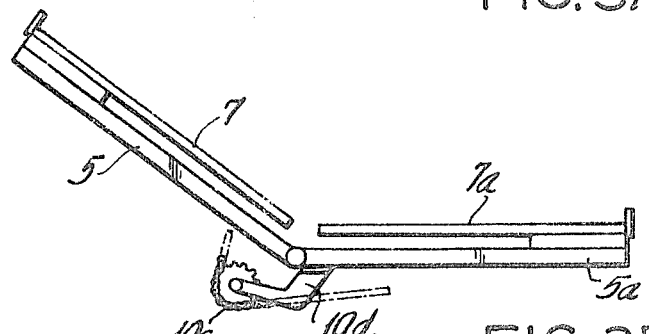

FIGS. 3, 3A and 3B show the actuating foot platforms in different positions and also the additional thrust by arm 10d and sprocket 10c.

FIG. 3 shows the forward platform drive system and FIG. 4 shows the rear platform drive system.

It is claimed:
1. A scooter vehicle comprising:
a chassis,
a front wheel mounted on the center line of the chassis,
a rear wheel mounted on the chassis,
a steering column attached to the front wheel,
a pair of ratchet gears, one connected to each side of the rear wheel,
a dual foot platform rotatively mounted on the chassis,
the platform having front and rear foot portions mounted with an angle of less than 180° between them,
first chain and sprocket means connecting the front platform constituting a compounding energy actuating gear mechanism for driving one of the ratchet gears and
second chain and sprocket means connecting the rear platform constituting compounding energy actuating gear mechanism for driving the other of the ratchet gears,
a set of two auxiliary wheels positioned on opposite sides of the scooter frame said wheels being joined for coordinated movement on a common axle mounted on the scooter frame,
means for permitting the set of auxiliary wheels to be swivelled to the rear and locked into an above ground position to avoid riding interference with the two centered main scooter wheels
means for swivelling the auxiliary wheels to ground contact position for four wheel riding balance and manuverability and means for positioning the auxiliary wheels to elevate the scooter drive wheel above ground contact for free standing pedal operation as an exercising unit.
2. A scooter vehicle comprising:
a chassis,
a front wheel mounted on the center line of the chassis,
a rear wheel mounted on the chassis,
a steering column attached to the front wheel,
a pair of ratchet gears, one connected to each side of the rear wheel,
a dual foot platform rotatively mounted on the chassis,
the platform having front and rear foot portions mounted with an angle of less than 180° between them,
first chain and sprocket means connecting the front platform constituting a compounding energy actuating gear mechanism for driving one of the ratchet gears and second chain and sprocket means connecting the rear platform constituting compounding energy actuating gear mechanism for driving the other of the ratchet gears, a semi-circular track mounted under the chassis, interconnecting cable means for a mechanical liason between the front and rear platform chain sprocket gear systems, with each platform system alternately expanding and contracting their chain drive movements over their gear systems by means of an interconnecting cable operating freely around the semicircular track aligned widthwise between the two chain systems and interconnected to them near their chain endings, an interjected spring connected to take up any chain slack, whereby when any one of the foot platforms is in upward movement expanding its chain length due to sprocket gear spread in driving engagement with its ratchet drive, the other foot platform in its opposing downward movement is simultaneously releasing through the liasion linkage cable an equivalent amount of chain to the other system as its sprocket gear spread is narrowed in downward platform movement, providing continuous intermittent ratchet drive from see-saw foot platform movement.

3. A scooter vehicle comprising:

a chassis, a front wheel mounted on the center line of the chassis, a rear wheel mounted on the chassis, a steering column attached to the front wheel, a pair of ratchet gears, one connected to each side of the rear wheel, a dual foot platform rotatively mounted on the chassis, the platform having front and rear foot portions mounted with an angle of less than 180° between them, first chain and sprocket means connecting the front platform constituting a compounding energy actuating gear mechanism for driving one of the ratchet gears and second chain and sprocket means connecting the rear platform constituting compounding energy actuating gear mechanism for driving the other of the ratchet gears, means for obtaining thrust in the chain sprocket gear system, comprising:

a curved arm mounted on the rear platform moveable understructure, a chain sprocket gear mounted on the end of the curved arm, and with the sprocket in withdrawn position when its related foot platform is in elevated non-driving position, and with its related foot platform in downward drive movement, causing the curved extension arm to move forward with its attached sprocket pressing forward against its engaged chain, contributing extra chain drive thrust in propelling the scooter.

4. A scooter vehicle comprising:

a chassis, a front wheel mounted on the center line of the chassis, a rear wheel mounted on the chassis, a steering column attached to the front wheel, a pair of ratchet gears, one connected to each side of the rear wheel, a dual foot platform rotatively mounted on the chassis, the platform having front and rear foot portions mounted with an angle of less than 180° between them, first chain and sprocket means connecting the front platform constituting a compounding energy actuating gear mechanism for driving one of the ratchet gears and second chain and sprocket means connecting the rear platform constituting compounding energy actuating gear mechanism for driving the other of the ratchet gears, coordinating mechanical cable connecting means between the first and second chain means actuated by the front and rear platforms, comprising:

a semi-circular track mounted on the bottom of the frame, a cable mounted on the semi-circular track, a spring mounted at one end of the cable, a first take-up sprocket connected to the other end of the spring, a second take-up sprocket connected to the other end of the cable, whereby the first and second chain means are coordinated by alternate expanding and contracting chain movements actuated by the foot platform.

5. A scooter vehicle comprising:

a chassis, a front wheel mounted on the center line of the chassis, a rear wheel mounted on the chassis, a steering column attached to the front wheel, a pair of ratchet gears, one connected to each side of the rear wheel, a dual foot platform rotatively mounted on the chassis, the platform having front and rear foot portions mounted with an angle of less than 180° between them, first chain and sprocket means connecting the front platform constituting a compounding energy actuating gear mechanism for driving one of the ratchet gears and second chain and sprocket means connecting the rear platform constituting compounding energy actuating gear mechanism for driving the other of the ratchet gears, a rear support structure secured to the scooter frame across the width of the scooter at an elevation slightly above the rear wheel, a hinged platform mounted on the support structure and positioned near the center above the rear wheel, spring means mounted to retain the hinged platform in horizontal position above the rear wheel, a brake mounted on one side of the platform positioned slightly above the tire and an electric motor on the other wing of the platform supporting with its rotor positioned slightly above the tire, a switch connecting the battery and the motor, a first pull down cable connected to simultaneously engage the battery switch and engage motor rotor in tire driving contact, a pressure hand holding control connected to the first cable on the handle bar of the scooter whereby the release of the hand pressure control causes the platform's spring element to return the platform to a horizontal position, a second pull-down cable actuated by hand pressure control from the scooter handle bar to draw down the other platform arm to engage the tire with the braking component, and with hand control pressure released, return the tire engaging brake component apparatus to its neutral position above the tire.

* * * * *